UNITED STATES PATENT OFFICE.

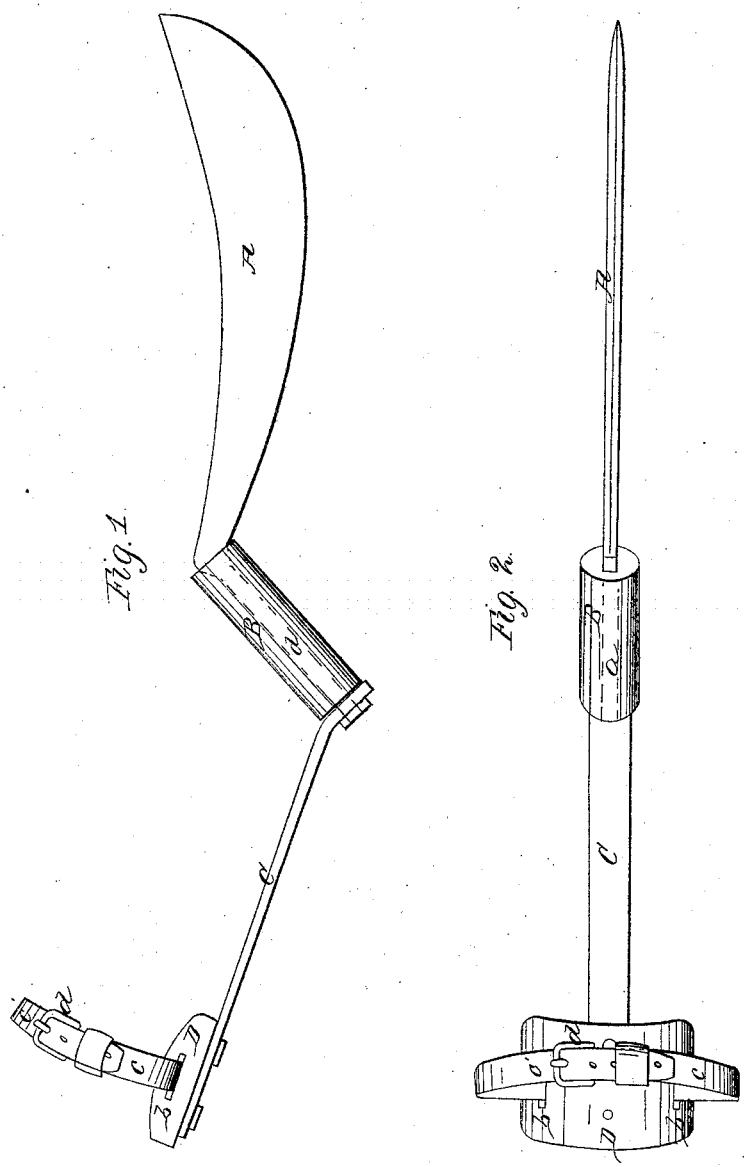

FRANK P. GOODALL, OF DEERING, NEW HAMPSHIRE.

PRUNING-KNIFE.

Specification of Letters Patent No. 25,818, dated October 18, 1859.

*To all whom it may concern:*

Be it known that I, FRANK P. GOODALL, of Deering, in the county of Hillsboro and State of New Hampshire, have invented an Improved Knife for Pruning Trees, Cutting up Bushes, &c.; and I do hereby declare that the same is fully described and represented in the following specification and the accompanying drawings, of which—

Figure 1, denotes a side elevation of the said implement, and Fig. 2, a top view thereof.

The nature of my invention consists in combining with, or applying to, the ordinary pruning knife, an arm rest or support, whereby the said knife is not only more easily operated, but far more efficient in execution.

The object I have had in view in making my invention, has been to produce a good and efficient implement for cutting up shrubs and bushes, and one which at the same time would be well adapted to pruning trees, etc.

In the drawings, A, represents the blade or knife which should be constructed of steel in the ordinary manner, the said knife having a "start" or shank, $a$, standing at an obtuse angle from the edge of the blade, as seen in Fig. 1. The said shank extends into and is secured to a cylindrical or other proper shaped handle, B, the said handle being jointed at its lower end to an arm rest or support, C, the same having a curved metallic plate, D, disposed on its outer end, of the form shown in the drawings. The said metallic plate or steadier has slots, $b$, $b$, formed on its opposite sides, for the reception of two straps, $c$, $c'$, each of which is respectively passed through one of said slots and around one of the outer edges of the plate, as seen in the drawings. To one of such straps, a buckle, $d$, is applied for the purpose of fastening the two straps together.

In operating with this implement, a person grasps the cylinder or handle, B, in his hand the arm resting upon the arm rest, or lever, C; he next buckles the straps tightly around his arm, thus bringing the arm rest and steadying plate to bear firmly upon the arm, such steadying plate and arm rest enabling great leverage to be brought upon the knife in comparison to what can be obtained by the ordinary pruning knife.

An implement constructed in the above described improved manner has been found to operate to excellent advantage.

I claim—

The improved article of manufacture or combination of pruning knife and arm rest arranged substantially as specified.

In testimony whereof I have hereunto set my signature.

FRANK P. GOODALL.

Witnesses:
LEWIS GOODALL,
ELLEN A. GOVE.